March 7, 1933. R. P. LANSING 1,900,063
ENGINE STARTING MECHANISM
Filed Sept. 17, 1929
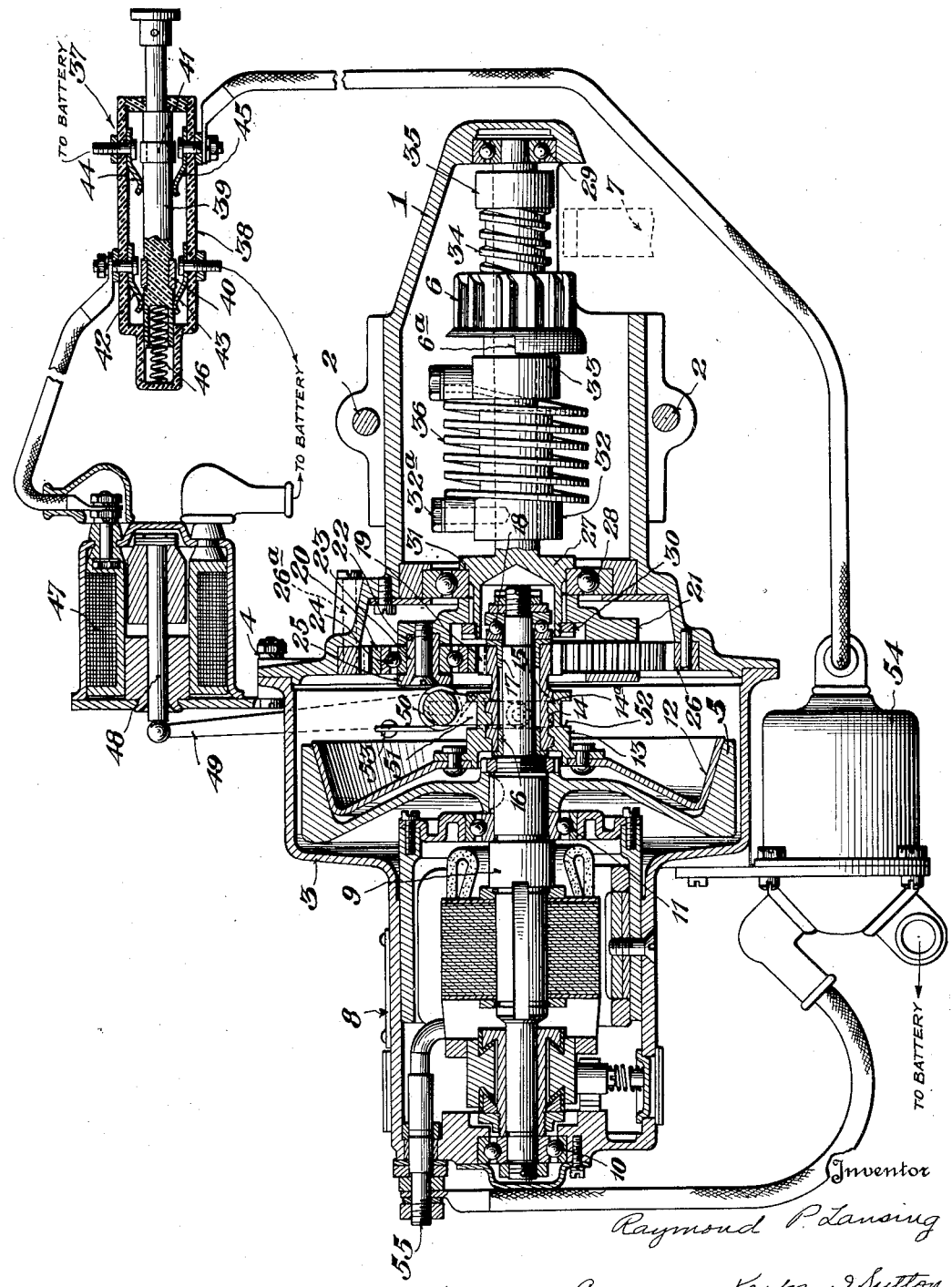

Patented Mar. 7, 1933

1,900,063

UNITED STATES PATENT OFFICE

RAYMOND P. LANSING, OF MONTCLAIR, NEW JERSEY, ASSIGNOR TO ECLIPSE AVIATION CORPORATION, OF EAST ORANGE, NEW JERSEY, A CORPORATION OF NEW JERSEY

ENGINE STARTING MECHANISM

Application filed September 17, 1929. Serial No. 393,272.

This invention relates to engine starting mechanism and more particularly though not exclusively to starting apparatus of the inertia type.

For the most part, starters of this character heretofore provided, have embodied a small high speed inertia member drivably connected through a reduction gearing to a rotating engine engaging member, capable of longitudinal movement into driving engagement with a complementary member drivably connected with the crankshaft of an engine to be started. The inertia member of starters of this type have heretofore been drivably connected with the engine engaging member during the period of storage of energy in said inertia member, so that the engine engaging member has an appreciable speed of rotation when moved into engagement with the engine member.

In certain instances it is desirable to prevent rotation of the engine engaging member until said member has become fully engaged with the engine member. Some difficulty has heretofore been encountered in attaining this result, and it is accordingly one of the objects of this invention to provide an inertia starter so constructed as to overcome this difficulty.

Another object of the invention is to provide a novel inertia starter which is light in weight, easy to assemble, and one which is particularly adapted for association with an engine employing a ring gear or toothed flywheel for starting, which gear or flywheel is drivably connected to the crankshaft.

A further object is to provide in an inertia starter having a small high speed flywheel and an engine engaging member, novel means for preventing transfer of energy from the flywheel to the member until sufficient energy has been stored in the former.

Another object is to provide in an inertia starter of the type embodying a flywheel and an engine engaging member adapted to be connected therewith, novel means including a resilient torque transmission element for drivably connecting said member and flywheel after the latter has had sufficient starting energy stored therein.

Other objects and features of novelty will be apparent from the following detailed description when taken in connection with the accompanying drawing. It is to be expressly understood, however, that the drawing is for purposes of illustration only, and is not designed as a definition of the limits of the invention, reference being had for this purpose to the appended claims.

Referring to the drawing, the single view of which is an axial section of a starter embodying the invention, certain portions thereof being shown in elevation, the starter comprises a housing constituted by an inner portion 1, adapted to be suitably secured, as by means of studs 2, to a portion of an engine crank case, not shown, and an outer portion 3 adapted to be secured to portion 1 as by means of bolts, one of which is shown at 4. Rotatably mounted within housing portion 3 is a flywheel 5, which is drivably connected in a manner to be more specifically hereinafter set forth, to a driven element 6 which is normally out of engagement with, but which is movable to engage and crank a member 7, which may be a ring gear or other toothed member drivably associated with the crankshaft of an engine to be started.

Means are provided for rotating the flywheel 5 at high speed in order to store therein sufficient kinetic energy to be utilized thereafter for starting purposes. In the form shown, such means is constituted by an electric motor, indicated generally at 8, suitably housed within the outer reduced portion of casing 3. Extending centrally through the motor is an armature shaft 9, rotatably supported in any suitable manner with respect to casing 3, as by means of ball bearings 10 and 11, and carrying the flywheel 5, which is adapted to be drivably connected to the shaft by any suitable means. In the form illustrated the flywheel is rigidly keyed to shaft 9 but as will be understood by those skilled in the art other means such as a suitable clutch may be employed.

Novel means are provided for controlling the driving relation between the driven member 6 and the flywheel 5. In the illustrated embodiment of the invention, such means is constituted by a cone clutch 12, having a hub 13 provided with internal spiral splines 14 which are adapted to cooperate with similar external splines 14ᵃ formed on a sleeve 15, rotatably carried by the inner end portion of shaft 9 as by means of flanged bushings 16 and 17 and ball bearing 18. From this construction it will be apparent that the sleeve 15 is drivably connected to shaft 9 only when the clutch is engaged with the flywheel.

In order to transmit motion from the sleeve to the driven member, when the clutch has been engaged with the flywheel, there is drivably associated with the sleeve, a driving pinion 19, constituting a sun gear which meshes with three planetary pinions 20, one of which is shown in section, and which are spaced apart at intervals of 120° around the end of an annular member 21. This member is provided with counterbores 22 adapted to receive sleeves 23 on which said planetary pinions are adapted to be rotatably mounted as by means of ball bearings 24 retained in position by ring 25.

The planetary pinions mesh with an internal gear 26 which is rigidly mounted in the enlarged portion of housing 1 as by means of screws, one of which is shown at 26ᵃ.

A driven shaft 27 is rotatably mounted in housing 1, as by means of bearings 28 and 29. The outer end of this shaft carries a nut 30 which coacts with a shoulder 31, to securely hold member 21 and the inner race of bearing 28 in driving relation with said shaft.

In order that rotation of the shaft 27 may be transferred to the driven member or pinion 6, there is provided a driving head 32, securely attached as by means of a screw 32ᵃ to the shaft, and adapted to rotate therewith. A driven head 33 having a threaded sleeve 34 formed integrally therewith, is loosely carried by the shaft, and is adapted to carry the pinion 6, which is provided internally with threads for cooperation with the threads on sleeve 34. Externally, the member 6 is cut away, as at 6ᵃ, for a purpose to be hereafter set forth. The end portion of the sleeve is provided with a stop member 35, fixedly carried thereby, in order to arrest longitudinal movement of the pinion 6. Resilient torque transmission means are provided between the driving and driven heads 32 and 33 respectively. In the form shown, such means is constituted by a coil spring 36 encircling shaft 27 and fixedly attached at either end to the above mentioned heads.

For controlling the operation of the starter, novel means are provided whereby the clutch 12 and the elements drivably connected therewith are disconnected from the flywheel until the latter has reached a desired speed, thereby insuring that sufficient energy has been stored therein for starting purposes. In the form shown, such means is constituted by a manually operable switch 37, adapted to control the electrical operation of the motor 8 and the movement of clutch 12.

The switch 37 is constituted by a casing 38 carrying a manually operable plunger 39, said casing and plunger being constructed of any suitable insulating material. Carried by the plunger are two copper sleeves 40 and 41 which are adapted to complete the electrical circuit between spring contact members 42, 43 and 44, 45 respectively, for a purpose which will appear more fully hereafter. These sleeves are so arranged on the plunger rod 39 that when the latter is moved inwardly, the circuit between contacts 42 and 43 is completed before the circuit between contacts 44 and 45. The plunger rod is normally maintained in the position indicated on the drawing by suitable resilient means such as a spring 46, so that both electrical circuits will remain open.

The electrical circuit controlled by the sleeve 40 is adapted to control the operative relation between the clutch 12 and flywheel 5. To this end a solenoid 47 is connected in series with a source of energy, not shown, and contacts 42 and 43. Carried by the solenoid is a movable core 48 which is adapted to actuate a lever 49. This lever is drivably connected to a rockshaft 50 extending laterally through housing portion 3 and provided therein with a yoke 51, suitably attached to said rockshaft and extending into an annular groove 52 formed on hub 13. From this construction, and due to the inclination of splines 14 and 14ᵃ, movement of the lever 49 towards the left will disengage clutch 12 from flywheel 5. The clutch 12 is, however, normally maintained in engagement with the flywheel, by any suitable means, such as a spring 53.

The electrical energizing circuit of motor 8 is controlled by the actuation of a solenoid switch 54, the contacts of which are adapted to complete the connection between a source of electrical energy, not shown, and the terminals of the motor, one of which is indicated at 55. The operation of the solenoid switch is controlled by sleeve 41 which is adapted to complete a circuit from a source of energy, not shown, through the coil of the switch 54.

In operation, a slight pressure on plunger 38 will at first cause sleeve 40 to complete the circuit to the solenoid 47, whereupon core 48 will be moved to the left, rocking the shaft 50 through lever 49 and causing clutch 12 to move out of engagement with flywheel 5 by reason of the force exerted by yoke 51 coacting with groove 52 on the hub of the flywheel. The inclination of the cooperating splines 14 and 14ᵃ is such that this force will cause a combined rotary and longitudinal movement of the clutch.

With the clutch thus disengaged, further pressure upon plunger 39 will complete the circuit through contacts 44 and 45, thus energizing the solenoid switch 54 which will cause energization of the motor 8. Flywheel 5 will thus be rotated and will have stored therein a large amount of kinetic energy to be thereafter employed for starting purposes. It is pointed out that during the period that energy is being stored in the flywheel, the plunger 39 is maintained in a completely depressed position.

As soon as sufficient energy has been stored in the flywheel, pressure upon the plunger 39 is released and spring 46 will return the plunger to its normal position. It will be noted, however, that as the plunger is returned to normal position the electrical circuit through contacts 44 and 45 will be broken before the electrical circuit through contacts 42 and 43. This enables the electric motor 8 to be deenergized before the clutch becomes engaged with the flywheel.

Upon the opening of the circuit through the solenoid 47, spring 53 rocks the shaft 50 to cause clutch 12 to engage the rotating flywheel. Rotation of the clutch will be imparted to the sleeve 13 and driving pinion 19, which will drive the planetary pinions 20. These pinions cooperate with the stationary gear 26, to rotate the member 21 which in turn drives the shaft 27. The driving head 32 which is drivably connected to the shaft, will drive the driven head 33 and threaded sleeve 34 through the resilient torque transmission spring 36. Rotation of the sleeve will cause the driven pinion 6 to move longitudinally into engagement with engine member 7, such longitudinal movement being caused by the unbalancing of member 6 due to the cut away portion 6ª, and the threaded cooperation between the pinion and shaft. The pinion moves longitudinally outward substantially without rotation until it engages the stop member 35, whereupon the pinion will thereafter rotate with the sleeve, thus transferring the energy stored in the flywheel to the member 7 of the engine to be started.

It is pointed out that the inclination of the coopreating splines 14 and 14ª is such that when the pinion 6 engages the engine member 7 the resistance to starting offered by the latter member will cause the frictional contact between clutch 12 and flywheel 5 to be automatically increased, thus augmenting the torque transmitting capacity of said clutch to a considerable extent, although of course not beyond the stress absorbing ability of the spring 36, the design of the clutch controlling sleeve 13 and the capacity of the clutch element 12 being such as to cause slippage of the latter in the event of any excess load sufficient to place the spring 36 in danger of failure. As soon as the engine starts under its own power, the pinion will be automatically demeshed from member 7, due to the screw action between the pinion and threaded sleeve.

There is thus provided a starter of the inertia type which is particularly adapted for use in cranking internal combustion engines of the type adapted to be cranked through a ring gear or other suitable toothed member. The provision of the clutch which is disengaged from the flywheel during the energy storing period permits of instant connection between the rotating flywheel and the driven member, thus insuring that when the latter is caused to engage the engine member, the said driven member will have drivably connected thereto, a rotating flywheel having a large amount of starting energy stored therein. The threaded cooperation between the sleeve and unbalanced driven member together with the clutch, enables the driven member to be drivably connected to a high speed flywheel and at the same time to be moved into engagement with the engine member quickly, efficiently and without any clashing of teeth or other undesirable disturbances. Since the elements of the starter are disconnected from the flywheel during the time that the latter is accelerated, it is possible to employ a small electric motor. The driven member is drivably connected to the flywheel through the medium of a resilient torque transmission spring which absorbs any shocks due to the engagement and disengagement between the engine engaging and engine members, which might otherwise cause serious damage to the starter mechanism.

While there has been illustrated and described herein, a particular starter construction, it is to be understood that the invention is not limited to the form shown. If desired, manual means may be employed for rotating the flywheel, instead of power means, or both manual and power means may be utilized for this purpose. Any suitable type of clutch may be employed for engaging the flywheel, rather than one of the cone type illustrated herein. It will be understood that the starter mechanism described herein may be utilized in starting various types of internal combustion engines, such as for example, engines of the character employed on automobiles.

Various changes may be made in the details of construction of the apparatus and arrangement of parts, as well understood by those skilled in the art. Reference will therefore be had to the appended claims for a definition of the limits of the invention.

What is claimed is:

1. In engine starting apparatus, a driven member adapted to engage and crank a member of an engine to be started, a driving shaft, a sleeve freely carried thereon said sleeve supporting said driven member, resilient means drivably connecting said shaft and sleeve, an inertia member, means for rotating said inertia member, a clutch element drivably connected to said shaft and adapted to engage but disengaged from said inertia member during the storage of energy in the latter, and means for causing engagement between said clutch element and said inertia member.

2. In engine starting mechanism, a driven member adapted to engage and crank a member of an engine to be started, a driving shaft, a driven sleeve carried thereby, said driven member being mounted for longitudinal and rotary movement on said sleeve, a driving head carried by said shaft, resilient torque transmission means drivably connecting said driving head and sleeve, an inertia member, a clutch drivably connected to said shaft and normally engaged with said inertia member, means to rotate said inertia member to store energy therein, and means operable to disengage said clutch from said inertia member during the energy storing period and to thereafter engage said clutch and member to transmit the stored energy to said driven member.

3. Engine starting mechanism comprising a driven member movable to engage and crank an engine member, an inertia member, means for rotating said inertia member to store energy therein said driven member being disconnected from said inertia member during the period of storage of energy in the latter, and a single means operable in one direction to discontinue the operation of said first mentioned means and to effect a driving connection between said inertia member and driven member.

4. Engine starting mechanism comprising a driven member movable to engage and crank an engine member, an inertia member, means for rotating said inertia member to store energy therein said driven member being disconnected from said inertia member during the period of storage of energy in the latter, and means including a manually operable device operable in one direction for discontinuing operation of said first mentioned means and for effecting a driving connection between said inertia member and driven member.

5. Engine starting mechanism comprising a driven member movable to engage and crank an engine member, an inertia member, means for rotating said inertia member to store energy therein said driven member being disconnected from said inertia member during the period of storage of energy in the latter, and means for drivably connecting said driven member to said inertia member said means including a resilient torque transmission member.

6. Engine starting mechanism comprising a driven member movable to engage and crank an engine member, an inertia member, means for rotating said inertia member to store energy therein said driven member being disconnected from said inertia member during the period of storage of energy in the latter, means including a clutch for drivably connecting said inertia and driven members, and a single means for operating said clutch and for discontinuing operation of said first mentioned means.

7. Engine starting mechanism comprising a driven member movable to engage and crank an engine member, an inertia member, means for rotating said inertia member to store energy therein said driven member being disconnected from said inertia member during the period of storage of energy in the latter, a clutch, means for drivably connecting said clutch to said driven member including a resilient torque transmission member, and means for engaging said clutch and inertia member.

8. In combination, a pinion adapted to engage and crank an engine member, a flywheel, means for rotating said flywheel to store energy therein, remotely controlled clutch means for drivably connecting said flywheel and pinion after the flywheel has reached a desired speed, and means for moving said pinion into engagement with the engine member.

9. In combination, a pinion adapted to engage and crank an engine member, a flywheel, means for rotating said flywheel to store energy therein, and means including a resilient torque transmission member for drivably connecting said flywheel and pinion after the flywheel has reached a desired speed.

10. In combination, a pinion adapted to engage and crank an engine member, a flywheel, means for rotating said flywheel to store energy therein, and remotely controlled means including a clutch for drivably connecting said flywheel and pinion after the flywheel has reached a desired speed, and means for moving said pinion into engagement with the engine member.

11. In combination, a pinion adapted to engage and crank an engine member, a flywheel, means for rotating said flywheel to store energy therein, remotely controlled clutch means and reduction gearing for drivably connecting said flywheel and pinion after the flywheel has reached a desired speed, and means for moving said pinion into engagement with the engine member.

12. In engine starting mechanism, a driven member adapted to engage and crank a member drivably associated with the crankshaft of an engine to be started, a flywheel, power means for rotating said flywheel and a single means operable to deenergize said power means and to establish a driving connection between said rotating flywheel and said driven member, said driving connection including reduction gearing.

13. In engine starting mechanism, a driven member adapted to engage and crank a member drivably associated with the crankshaft of an engine to be started, a flywheel, an electric motor for rotating said flywheel, means including a switch for controlling said motor and maintaining said rotating flywheel disconnected from said driven member while said motor remains energized, and means for moving said driven member into engagement with the engine member.

14. An engine starter of the class described comprising a driven member movable to engage and crank a member of an engine to be started, an inertia member said inertia member being normally drivably connected to said driven member, a power device for rotating said inertia member, and means for disconnecting said driven member from said inertia member and for thereafter energizing said power device, said means being operable after said inertia member has reached a desired speed to deenergize said power device and to thereafter establish a driving connection between said rotating flywheel and said driven member.

15. In combination, a pinion adapted to engage and crank an engine member, a flywheel, means for rotating said flywheel to store energy therein, means including a resilient torque transmission member for drivably connecting said flywheel and pinion after the flywheel has reached a desired speed, and means for automatically moving said pinion into engagement with the engine member.

16. In starting apparatus of the type described, a driven member adapted to be moved into engagement to crank a member of an engine to be started, an inertia member, means to rotate said inertia member, a clutch, means for drivably connecting said clutch and driven member said means including a resilient torque transmitting member, and means for drivably connecting said clutch and inertia member after the latter has reached a desired speed.

17. In engine starting apparatus of the type having a driven member movable to engage and crank an engine member, a flywheel, means for rotating said flywheel, means including a normally engaged clutch for drivably connecting said flywheel and driven member and a single means movable in one direction to cause disengagement of said clutch and energization of said first mentioned means, and movable in another direction to cause deenergization of said first mentioned means and engagement of said clutch.

18. Engine starting mechanism comprising a driven member movable to engage and crank an engine member, an electric motor, means for rotating said electric motor to store energy therein, said driven member being disconnected from said electric motor during the period of storage of energy in the latter, a clutch for drivably connecting said driven member to said electric motor, control means for said clutch, and a single source of energy for said motor and clutch control means.

19. Engine starting mechanism comprising a driven member movable to engage and crank an engine member, an electric motor, means for rotating said electric motor to store energy therein, said driven member being disconnected from said electric motor during the period of storage of energy in the latter, a clutch for drivably connecting said driven member to said electric motor, and a common control means for said clutch and motor.

20. Engine starting mechanism comprising a driven member adapted to engage and crank an engine member a prime mover, means for rotating said prime mover to store energy therein, said driven member being disconnected from said prime mover during the period of storage of energy in the latter, a clutch for drivably connecting said driven member to said prime mover, and common control means for said clutch and prime mover.

21. In engine starting mechanism, a driven member adapted to engage and crank a member drivably associated with the crankshaft of an engine to be started, a flywheel, a prime mover for rotating said flywheel, electro-magnetic means for maintaining said driven member disconnected from said flywheel during the actuation of said prime mover, and means for moving said driven member into engagement with the engine member following the de-energization of said electro-magnetic means.

22. In engine starting mechanism, a driven member adapted to engage and crank a member drivably associated with the crankshaft of an engine to be started, a flywheel, a prime mover for rotating said flywheel, means for maintaining said driven member disconnected from said flywheel during the actuation of said prime mover, and means operative upon de-energization of said maintaining means for moving said driven member into engagement with the engine member.

23. In engine starting mechanism, a driven member adapted to engage a cranking member drivably associated with the crankshaft of an engine to be started, an electric motor, means for rotating said electric motor to store energy for subsequent transmission to said engine member through said driven member, means for maintaining said driven member disconnected from said electric motor during the period of storage of energy in the latter, and means for rendering said maintaining means ineffective concurrently with the de-energization of said electric motor.

24. In engine starting mechanism, a driven member adapted to engage a cranking member drivably associated with the crankshaft of an engine to be started, an electric motor, means for rotating said electric motor to store energy for subsequent transmission to said engine member through said driven member, an electro-magnetic device for maintaining said driven member disconnected from said electric motor during the period of storage of energy in the latter, and common means for controlling said electro-magnetic device and said motor.

In testimony whereof I have signed this specification.

RAYMOND P. LANSING.